United States Patent
Roske (10) Patent No.: US 11,578,797 B2
(45) Date of Patent: Feb. 14, 2023

(54) DEVICE FOR COOLING AND LUBRICATING COMPONENTS OF A VEHICLE AND DRIVE DEVICE HAVING A DEVICE OF THIS TYPE

(71) Applicant: ZF Friedrichshafen AG, Friedrichshafen (DE)

(72) Inventor: Michael Roske, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/568,089

(22) Filed: Jan. 4, 2022

(65) Prior Publication Data

US 2022/0221047 A1 Jul. 14, 2022

(30) Foreign Application Priority Data

Jan. 14, 2021 (DE) ...................... 10 2021 200 278.1

(51) Int. Cl.
| | | |
|---|---|---|
| *F16H 57/04* | (2010.01) | |
| *F16H 57/037* | (2012.01) | |
| *F16H 57/02* | (2012.01) | |

(52) U.S. Cl.
CPC ....... *F16H 57/0476* (2013.01); *F16H 57/037* (2013.01); *F16H 57/043* (2013.01);
(Continued)

(58) Field of Classification Search
CPC ............... F16H 57/0476; F16H 57/037; F16H 57/0415; F16H 57/0421; F16H 57/043;
(Continued)

(56) References Cited

U.S. PATENT DOCUMENTS

| | | |
|---|---|---|
| 6,457,564 B1 | 10/2002 | Damm et al. |
| 10,738,878 B2 | 8/2020 | Kiyokami et al. |

(Continued)

FOREIGN PATENT DOCUMENTS

| | | |
|---|---|---|
| DE | 1755164 C3 | 8/1978 |
| DE | 102017203527 A1 | 9/2018 |

(Continued)

OTHER PUBLICATIONS

German Office Action DE 10 2021 200 278.1, dated Aug. 5, 2021. (12 pages).

*Primary Examiner* — Colby M Hansen
(74) *Attorney, Agent, or Firm* — Dority & Manning, P.A.

(57) ABSTRACT

A device (1) for cooling and lubricating components of a vehicle (2) includes at least one housing (3), a coolant sump (4), a first coolant pump (5.1) configured for delivering coolant (6) from a first housing section (A) for accommodating a transmission (12) into the coolant sump (4), a second coolant pump (5.2) configured for delivering coolant (6) from the coolant sump (4) into a coolant line system (8), and a heat exchanger (7) configured for cooling the coolant (6) delivered by the second coolant pump (5.2). The coolant line system (8) fluidically connects at least the second coolant pump (5.2) to the heat exchanger (7) and, at least indirectly, fluidically connects the heat exchanger (7) to multiple coolant outlets (11.1, 11.2, 11.3, 11.4, 11.5) for spraying coolant (6) onto components in the housing (3) that require cooling and lubrication.

15 Claims, 2 Drawing Sheets

(52) U.S. Cl.
CPC ....... *F16H 57/046* (2013.01); *F16H 57/0415* (2013.01); *F16H 57/0421* (2013.01); *F16H 57/0436* (2013.01); *F16H 57/0445* (2013.01); *F16H 57/0483* (2013.01); *F16H 2057/02034* (2013.01)

(58) Field of Classification Search
CPC ............ F16H 57/0436; F16H 57/0445; F16H 57/046; F16H 57/0483; F16H 2057/02034
USPC .......................................................... 475/150
See application file for complete search history.

(56) References Cited

U.S. PATENT DOCUMENTS

| | | |
|---|---|---|
| 10,948,070 B2 | 3/2021 | Kuhl et al. |
| 2012/0299419 A1 | 11/2012 | Tanaka et al. |
| 2018/0073395 A1* | 3/2018 | Parnin ................. F16H 57/0442 |
| 2018/0347687 A1* | 12/2018 | Waser ................. F16H 57/0457 |
| 2019/0186622 A1 | 6/2019 | Ishikawa et al. |
| 2019/0229582 A1 | 7/2019 | Ito et al. |
| 2019/0291570 A1 | 9/2019 | Tang et al. |
| 2020/0295628 A1* | 9/2020 | Reichert .............. H02K 5/1735 |

FOREIGN PATENT DOCUMENTS

| | | |
|---|---|---|
| DE | 102018113297 A1 | 12/2018 |
| DE | 102019213588 A1 | 5/2020 |
| DE | 102019128957 A1 | 4/2021 |
| JP | 2001-330108 A | 11/2001 |
| JP | 2007-247706 A | 9/2007 |

\* cited by examiner

Fig. 4

US 11,578,797 B2

DEVICE FOR COOLING AND LUBRICATING COMPONENTS OF A VEHICLE AND DRIVE DEVICE HAVING A DEVICE OF THIS TYPE

CROSS-REFERENCE TO RELATED APPLICATION

The present application is related and has right of priority to German Patent Application No. 102021200278.1 filed in the German Patent Office on Jan. 14, 2021, which is incorporated by reference in its entirety for all purposes.

FIELD OF THE INVENTION

The invention relates generally to a device for cooling and lubricating components of a vehicle, including a housing. The components of the vehicle requiring cooling and lubrication are arranged in the housing. The invention further also relates generally to a drive device having an electric prime mover for a vehicle, including a device of this type for cooling and lubricating.

BACKGROUND

An effective cooling of the electric machine is necessary so that an electric machine for driving a vehicle can be operated at high power levels. The waste heat of the electric machine arising at high power levels can be power-limiting for certain applications, for example, electrically driven axles. As soon as the electric machine exceeds a limiting temperature, a control unit of the electric machine typically reduces the power.

For example, DE 10 2017 203 527 A1 discloses a device for cooling and lubricating a transmission for a vehicle, including a transmission housing and at least one input pinion in the transmission housing, which is rotatable about a first axis of rotation, and an output gearwheel, which is rotatable about a second axis of rotation, which is arranged in parallel to the first axis of rotation, and a collection element. The collection element is mounted at the transmission housing in the area of an opening, which is located at the transmission housing, wherein the output gearwheel is brought into contact with a fluid for cooling and lubrication. The collection element includes a projection, wherein the projection is directed toward an outer circumference of the output gearwheel. During a rotation of the output gearwheel, the outflowing fluid is directed into the collection element by the projection.

SUMMARY OF THE INVENTION

Example aspects of the present invention provide a device for cooling and lubricating components of a vehicle and a drive device for a vehicle having improved cooling. In particular, the device is to be designed to be easy to install and the drive device is to have a high efficiency.

A device according to example aspects of the invention for cooling and lubricating components of a vehicle includes: at least one housing; a coolant sump; a first coolant pump, which is configured for delivering coolant from a first housing section, which is configured for accommodating a transmission, into the coolant sump; a second coolant pump, which is configured for delivering coolant from the coolant sump into a coolant line system; and a heat exchanger, which is configured for cooling the coolant delivered by the second coolant pump. The coolant line system fluidically connects at least the second coolant pump to the heat exchanger and, at least indirectly, fluidically connects the heat exchanger to multiple coolant outlets for spraying coolant onto components in the housing that require cooling and lubrication.

In other words, the device according to example aspects of the invention is utilized for cooling and lubricating the components of the vehicle arranged in the housing. In particular, the coolant circuit is designed to be closed within the housing, so that no coolant gets out. The coolant is designed, in particular, as cooling liquid, for example, based on oil or based on water. For example, the coolant is designed as transmission oil, motor oil, or similar oil for vehicle components. The coolant is provided, on the one hand, for absorbing and dissipating heat and, on the other hand, for lubricating parts and/or components, so that the parts and/or components can interact with low wear.

The coolant is delivered by the first coolant pump from the first housing section, i.e., a first housing cavity, in which the transmission is accommodated, into the coolant sump and, from there, into the coolant line system via a second coolant pump, wherein the coolant line system routes the coolant to the coolant outlets at least via the heat exchanger. The coolant outlets spray the coolant onto multiple, e.g., in particular onto all, components of the vehicle requiring cooling and lubrication that are arranged within the housing of the device. From the components cooled and lubricated by coolant, the coolant is delivered into the coolant sump again at least via the first coolant pump. The coolant sump is to be understood as a collection point for the coolant in the housing. For example, a coolant container is arranged in the housing and is configured for accommodating the coolant sump and as a collection point for the coolant in the housing. The second coolant pump delivers the coolant from the coolant sump and the coolant container through the coolant circuit at least indirectly via further components, lines, or openings. For example, the housing of the device is designed as one piece or two pieces. Both coolant pumps are preferably designed as electric pumps, wherein the electric pumps can be controlled by an open-loop system according to demand.

Due to the fact that the first coolant pump actively delivers the coolant from the first housing section, in which the transmission is arranged, a coolant sump does not form in the first housing section, and so the gearwheels of the transmission are in fact lubricated by the coolant but do not churn in the coolant. This increases, in particular, the efficiency of the transmission and, thereby, also the efficiency of the entire drive train.

According to one preferred example embodiment of the invention, the first coolant pump is configured for delivering a liquid-air mixture, wherein the second coolant pump is designed as a positive displacement pump. For example, the first coolant pump is designed as a centrifugal pump. In particular, the first coolant pump is smaller than the second coolant pump and also has a lower delivery rate for coolant. Preferably, the first coolant pump is arranged in the first housing section. The design of the second coolant pump as a positive displacement pump and the delivery of the coolant from the coolant sump by the positive displacement pump have, in particular, acoustic advantages. Since a sufficient amount of coolant is present in the coolant sump, the positive displacement pump can be operated in a particularly low-wear and low-cavitation manner. Cavitation results not only in the wear of the positive displacement pump, but also in acoustic emissions. The positive displacement pump is well known from the prior art. A positive displacement pump is to be understood as a pump that operates according to the principle of positive displacement. The positive displacement pump is also referred to as a volumetric pump and delivers the medium, namely the coolant in the present case, in a closed volume, in particular in an air-free manner in the present case.

According to one preferred example embodiment of the invention, the coolant line system includes a coolant reservoir having a single coolant inlet, wherein all coolant outlets are arranged at the coolant reservoir. In particular, a single coolant reservoir is provided in the housing of the device. The coolant reservoir is preferably monolithically designed and includes the single coolant inlet and the plurality of coolant outlets. For example, the coolant reservoir is designed as a type of "common rail", which is also known as accumulator injection with respect to internal combustion engines, in particular diesel engines. For example, the second coolant pump is designed as a high pressure pump, which delivers the coolant, in a pressurized manner, into the coolant reservoir. Preferably, the pressure level in the coolant reservoir is variably adjustable. For example, the coolant inlet is designed axially centrally in the coolant reservoir. Alternatively, the coolant inlet can be designed on one side at one of the two end sections of the coolant reservoir. Due to the provision of the coolant reservoir with a single coolant inlet for injecting coolant as well as multiple coolant outlets for spraying coolant onto multiple, e.g., in particular onto all, components in the housing of the device requiring cooling and lubrication, not only is an improved cooling created, but rather the ease of installation of the device is also increased.

Unless indicated in greater detail, a fluidic connection is implemented by way of fluid-conveying components, in particular ducts, lines, pipes, and/or hoses, which are configured for guiding the coolant.

According to one preferred example embodiment of the invention, at least the coolant line system and the coolant reservoir are integrated in the housing. An integration of the coolant line system and of the coolant reservoir in the housing of the device is to be understood to mean that the coolant line system and the coolant reservoir are indirectly or directly arranged in or at the housing. For example, the coolant line system and the coolant reservoir can be arranged as indentations in walls of the housing in order to reduce the number of components and the installation effort of the device. For example, the coolant line system and the coolant reservoir can be arranged as ducts, pipes, lines, and/or hoses in or at walls of the housing. Preferably, the heat exchanger and/or the second coolant pump are/is also integrated in the housing of the device. The integration of at least the coolant line system and the coolant reservoir in the housing increases the ease of installation of the device.

According to one preferred example embodiment of the invention, the housing has a second housing section for accommodating an electric machine including a stator and a rotor. Therefore, the transmission is arranged in the first housing section, wherein the electric machine including the stator and the rotor is arranged in the second housing section. A housing section is to be understood as an essentially closed cavity within the housing, wherein the housing sections are separated from one another by housing walls. For example, openings or similar passages for coolant can be arranged in the walls in order to implement a flow of coolant between the essentially closed housing sections. The spatial separation between the transmission and the electric machine enables an improved and more demand-oriented adjustment of the coolant supply and atmosphere in the particular housing section.

According to one preferred example embodiment of the invention, the housing includes a third housing section, wherein coolant from the first housing section is deliverable at least via the first coolant pump into the third housing section, and wherein coolant from the second housing section, via at least one opening provided therefor, into the third housing section in order to form the coolant sump there. In other words, the at least one opening in the housing wall between the second and third housing sections is utilized for routing coolant from the second housing section into the third housing section, where the coolant sump is arranged. For example, an air separator can be arranged in the third housing section, which is configured for withdrawing air from the coolant. The arrangement of the coolant sump in another housing section separated from the transmission and the electric machine enables a stabilized coolant sump, in particular having a smaller portion of air and/or foam in the coolant.

According to one preferred example embodiment of the invention, at least one coolant filter is arranged in the third housing section, wherein the at least one coolant filter is fluidically connected to the second coolant pump. The coolant filter is configured, in particular, for filtering dirt particles, foreign objects, and/or foreign fluids out of the coolant in order to maintain a high quality of the coolant for as long as possible and extend maintenance intervals of the device.

According to one preferred example embodiment of the invention, a wall of the housing between the first housing section and the second housing section is designed for accommodating at least one bearing element, wherein the at least one bearing element is configured for routing coolant between the first housing section and the second housing section. In other words, a coolant flow between the first housing section and the second housing section is implemented via the at least one bearing element in the wall of the housing. For example, the at least one bearing element conveys coolant from the first housing section into the second housing section, or vice versa, due to rotation during a driving operation of the vehicle. This advantageously contributes to the coolant distribution and to the coolant mixing in the housing.

According to one preferred example embodiment of the invention, the housing includes a fourth housing section for accommodating at least the coolant line system and the coolant reservoir, wherein the fourth housing section extends at least partially along the first, second, and third housing sections. Consequently, at least the coolant line system and the coolant reservoir are arranged in the fourth housing section, and so these are spatially separated from the transmission and from the electric machine. As a result, an ease of installation of the device is improved. In particular, the second coolant pump and the heat exchanger are also arranged in the fourth housing section. The integration of the second coolant pump, the heat exchanger, the coolant line system, and the coolant reservoir in the fourth housing section further increases the ease of installation of the device. In particular, this integration promotes a modular configuration of the housing. For example, the fourth housing section abuts the first housing section with at least one wall. For example, the fourth housing section abuts the second housing section with at least one wall, preferably with two walls. For example, the fourth housing section abuts the third housing section with at least one wall.

According to one preferred example embodiment of the invention, at least one first coolant outlet is configured for spraying coolant onto stator windings of the stator, wherein the at least one first coolant outlet is fluidically connected to multiple first spray nozzles, which are configured for being arranged at least partially circumferentially around the stator windings. A spray nozzle is to be understood as an opening, through which coolant is sprayed in a targeted and, thereby, controlled manner onto components in the housing requiring cooling and lubrication. In the present case, the first spray nozzles spray the coolant in a targeted and, thereby, controlled manner onto the stator windings and/or winding overhangs of the stator. Due to the direct wetting of the surfaces of the stator windings, the cooling potential for the electric machine increases considerably. This is the case because a direct and immediate cooling takes place at the spot of the heat development, namely at the stator windings. For example, at least three first spray nozzles are arranged in the tangential direction circumferentially around each of the two stator windings. In particular, so many first spray nozzles are arranged in the tangential direction circumferentially around each of the two stator windings that a complete wetting of the two stator windings with coolant is achieved.

According to one preferred example embodiment of the invention, at least one second coolant outlet is configured for spraying coolant onto an outer circumferential surface of the stator, wherein the at least one second coolant outlet is fluidically connected to multiple second spray nozzles, which are configured for being arranged in the longitudinal direction of the stator. Consequently, coolant flows via the at least one second coolant outlet and the second spray nozzles in a targeted and, thereby, controlled manner onto the outer circumferential surface, i.e., the lateral surface of the stator, in particular onto the laminations of the stator. Due to the direct wetting of the outer circumferential surface of the stator, the cooling potential for the electric machine increases considerably. This is the case because a direct and immediate heat dissipation takes place via the coolant at the outer circumferential surface of the stator. For example, at least three second spray nozzles are arranged in the axial direction, i.e., along a longitudinal axis of the stator. For example, multiple rows of spray nozzles are arranged in the circumferential direction around the stator. In particular, so many second spray nozzles are arranged in the tangential direction circumferentially around the stator windings that a complete wetting of the outer circumferential surface of the stator with coolant is achieved.

Preferably, the particular spray nozzle has an orifice. An orifice is to be understood as an element that at least partially closes the particular spray nozzle or opening and/or changes a cross-section of the spray nozzle or opening in such a way that the flow rate and, in particular, also a spray direction and a shape of the spray jet are adjusted. In addition to the flow rate, the orifice also adjusts a pressure of the coolant in the coolant line system and/or in the optionally available coolant reservoir. Moreover, a suction effect for the coolant from the coolant line system can be adjusted via orifices at the spray nozzles in such a way that a constant flow resistance is set regardless of the number of spray nozzles that are connected to the particular coolant outlet. Preferably, all spray nozzles are supplied with an identical pressure level.

According to one preferred example embodiment of the invention, at least one third coolant outlet is configured for spraying coolant onto at least one teeth-meshing area of gearwheels. As a result, the teeth-meshing area of gearwheels can be immediately and advantageously lubricated. In particular, the gearwheels are arranged in the first housing section and are part of the transmission. For example, a first gearwheel is rotationally fixed to the rotor shaft of the electric machine, wherein a second gearwheel is rotationally fixed to a component of a differential gear, in particular to a differential cage or a planet carrier. In the teeth-meshing area, two gearwheels engage with one another in order to transmit a rotational speed and a torque from the one gearwheel onto the other gearwheel.

According to one preferred example embodiment of the invention, at least one fourth coolant outlet is configured for spraying coolant onto at least one bearing element. As a result, the at least one bearing element can be immediately and advantageously lubricated. For example, the at least one bearing element is configured for the rotatable mounting of the rotor shaft. Preferably, the at least one bearing element is designed as a cylindrical roller bearing or a ball bearing.

According to one preferred example embodiment of the invention, at least one fifth coolant outlet is configured for spraying coolant into at least one first pan. A pan is to be understood as a catch basin for coolant, and so the coolant can accumulate in the pan. For example, the at least one first pan can have an opening in order to allow coolant to pass through to a further bearing or other components in the housing that require cooling and lubrication. In particular, the at least one first pan is configured for providing coolant for a bearing element, and so the bearing element draws coolant from the at least one first pan, depending on the load and in particular depending on the rotational speed, and, thereby, supplies itself. For example, the coolant can be routed from the at least one first pan via the bearing element between two housing sections.

According to one preferred example embodiment of the invention, the first coolant pump has a greater delivery rate for coolant than the joint delivery rate for coolant of the at least one third coolant outlet, of the at least one fourth coolant outlet, and of the at least one fifth coolant outlet, wherein the at least one third coolant outlet, the at least one fourth coolant outlet, and the at least one fifth coolant outlet deliver coolant into the first housing section. In other words, the potential to deliver coolant from the first housing section is greater than the potential to spray coolant into the first housing section. As a result, a minimal coolant volume is implemented in the first housing section, wherein coolant is sprayed through the particular coolant outlets in a targeted manner and according to demand onto components in the first housing section that require cooling and lubrication. This increases, in particular, the efficiency of the transmission and, thereby, also the efficiency of the entire drive train.

A drive device for a vehicle includes a device according to example aspects of the invention, including a housing, an electric machine having a stator and a rotor, and a transmission, wherein a rotor shaft of the electric machine is drivingly connected to the transmission via at least one gear stage including a first gearwheel and a second gearwheel, wherein the transmission is designed as a differential gear and has a first output shaft and a second output shaft, wherein the two output shafts are arranged axially parallel to the rotor shaft.

In other words, the drive device is arranged in the housing of the device for cooling and lubricating the components of the vehicle, in particular for cooling and lubricating the transmission and the electric machine, which is provided as the prime mover for the vehicle. The electric machine can be utilized either alone or in combination with a further electric machine or an internal combustion engine for driving the vehicle. For example, the electric machine is configured for driving an axle of the vehicle. For example, the vehicle is designed as a motor vehicle. The two output shafts of the differential gear are each at least indirectly connected to at least one wheel of the vehicle. The output shafts are arranged coaxially to an output axis.

Preferably, the differential gear is designed as a bevel gear differential. Moreover, other alternative example embodiments of the differential are also conceivable, for example, as a spur gear differential or a planetary differential. The drive power coming from the electric machine via the gear stage is transmitted onto the two output shafts via the differential gear, wherein the differential gear distributes the drive power, i.e., a rotational speed and a torque, onto the two output shafts. The differential is also arranged on the output axis so that the output shafts are situated coaxially on the output axis.

A differential gear designed as a bevel gear differential includes two wheel-side output elements, in particular a first output gear and a second output gear. The two output gears each mesh with a compensating element. The compensating elements are mounted, rotatable about their own axes, in a differential cage. The particular output gear is rotationally fixed to the particular output shaft. The drive of the differential takes place via the differential cage. In particular, the second gearwheel of the gear stage is a relatively large gearwheel, which is rotationally fixed to the differential cage and meshes with a gearwheel that is small by comparison, which is rotationally fixed to the rotor shaft. The small gearwheel is the first gearwheel of the gear stage. Consequently, the large gearwheel and the small gearwheel form the gear stage, wherein a ratio is set at least as a function of the numbers of teeth of the two gearwheels.

The electric machine includes the rotatable rotor and the housing-affixed stator and can be operated as a motor or as a generator. When the electric machine is operated as a motor, an, in particular, time-varying voltage can be applied to the stator and to the windings located therein, in order to generate a time-varying magnetic field, which acts in the rotor to induce a torque and, thereby, generate a turning motion. When the electric machine is operated as a generator, for example, electrical energy can be generated by inducing a changing magnetic field, for example, by rotating the rotor, in a looped or coiled conductor of the stator, in order to induce a current in the conductor. The electrical energy generated in the generator mode can be stored in a battery. In the motor mode, the electrical energy of the electric machine is supplied from the battery in order to drive the vehicle.

According to one preferred example embodiment of the invention, the rotor shaft is rotatably mounted in the housing via a first bearing element, a second bearing element, and a third bearing element, wherein the first bearing element is arranged, together with the transmission and the first coolant pump, in a first housing section, wherein the second bearing element is arranged, together with the electric machine, in a second housing section, and wherein the third bearing element is arranged in a wall of the housing between the first housing section and the second housing section. In particular, the third bearing element is utilized for routing the coolant between the first housing section and the second housing section. For example, the first bearing element is designed as a cylindrical roller bearing. For example, the second and third bearing elements are designed as ball bearings. The spatial separation between the transmission and the electric machine enables an improved and more demand-oriented adjustment of the coolant supply and atmosphere in the particular housing section.

According to one preferred example embodiment of the invention, the first output shaft is rotatably mounted in the housing via a fourth bearing element, wherein the second output shaft is rotatably mounted in the housing via a fifth bearing element and a sixth bearing element, wherein the fourth bearing element is arranged, together with the transmission and the first coolant pump, in the first housing section, wherein the fifth bearing element is arranged, together with the electric machine, in the second housing section, and wherein the sixth bearing element is arranged in the wall of the housing between the first housing section and the second housing section. In particular, the sixth bearing element is utilized for routing the coolant between the first housing section and the second housing section. For example, the second bearing element is designed as a ball bearing. For example, the first and third bearing elements are designed as tapered roller bearings. The spatial separation between the transmission and the electric machine enables an improved and more demand-oriented adjustment of the coolant supply and atmosphere in the particular housing section.

BRIEF DESCRIPTION OF THE DRAWINGS

A preferred embodiment of the invention is explained in greater detail in the following with reference to the drawings, wherein identical elements are labeled with the same reference character, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
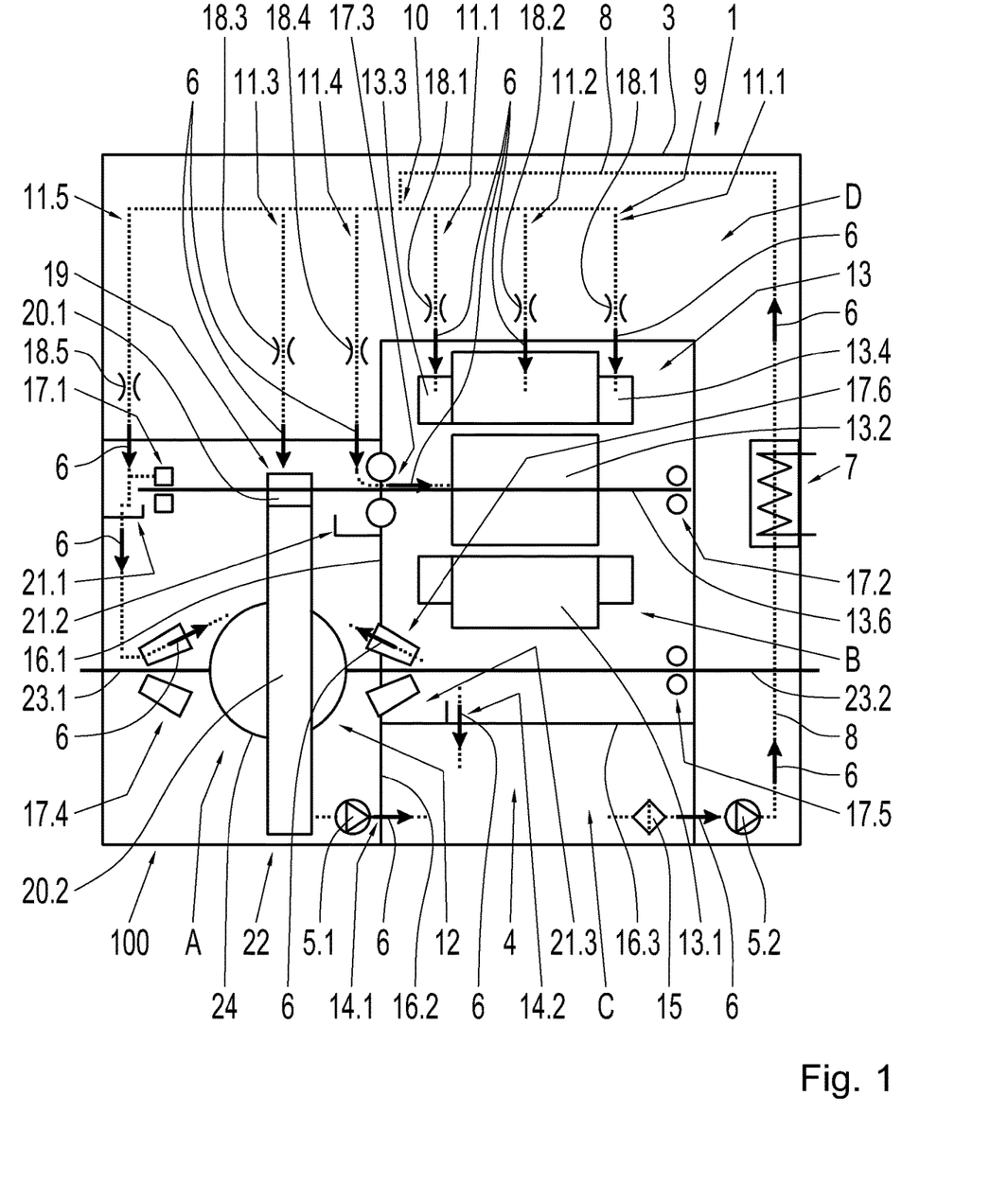
FIG. 1 shows a highly simplified diagrammatic sectioning of a drive device according to example aspects of the invention including a device according to example aspects of the invention for cooling and lubricating components in a housing.
Figure 4:
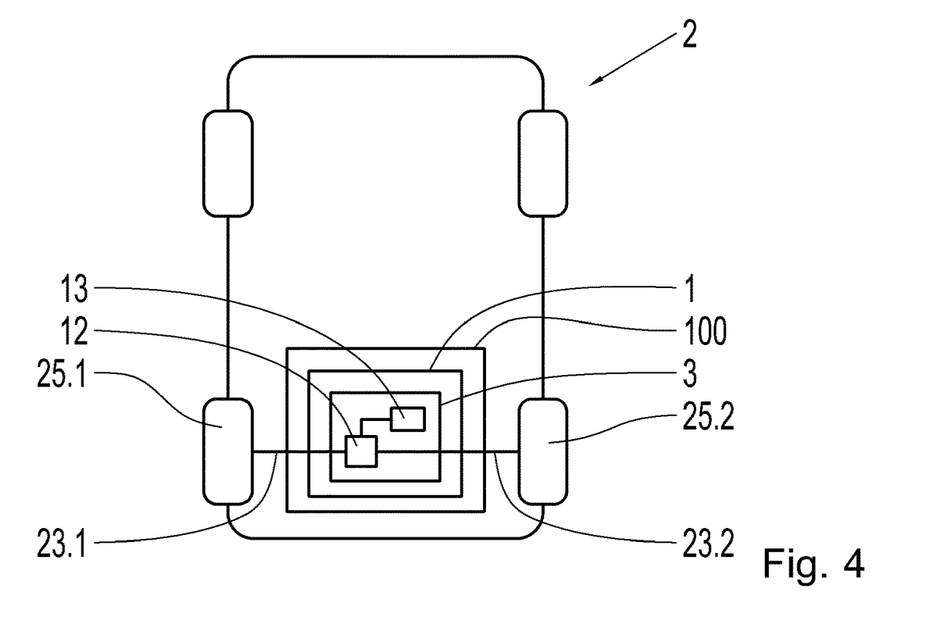
FIG. 4 shows a vehicle including a drive device according to example aspects of the invention, according to FIG. 1.

According to FIG. 1, a drive device 100 according to example aspects of the invention for a vehicle 2, which is represented in FIG. 4, includes a device 1 for cooling and lubricating components of the vehicle 2 that are arranged in a housing 3 of the device 1. In the present case, an electric machine 13 including a stator 13.1 and a rotor 13.2, and a transmission 12 are arranged in the housing 3, wherein a rotor shaft 13.6 of the electric machine 13 is drivingly connected to the transmission 12 via a gear stage 22. The rotor 13.2 is rotationally fixed to the rotor shaft 13.6. The transmission 12 is designed as a differential gear and includes a first output shaft 23.1 and a second output shaft 23.2. The two output shafts 23.1, 23.2 are arranged axially parallel to the rotor shaft 13.6.

The rotor shaft 13.6 is rotatably mounted in the housing 3 via a first bearing element 17.1, which is designed as a cylindrical roller bearing, a second bearing element 17.2, which is designed as a ball bearing, and a third bearing element 17.3, which is designed as a ball bearing. The first bearing element 17.1 is arranged, together with the transmission 12, in a first housing section A. The second bearing element 17.2 is arranged, together with the electric machine 13, in a second housing section B. The third bearing element 17.3 is arranged in a wall 16.1 of the housing 3 between the first housing section A and the second housing section B. The third bearing element 17.3 is configured for routing coolant 6 between the first housing section A and the second housing section B.

The first output shaft 23.1 is rotatably mounted in the housing 3 via a fourth bearing element 17.4, which is designed as a tapered roller bearing. The second output shaft 23.2 is rotatably mounted in the housing 3 via a fifth bearing element 17.5, which is designed as a ball bearing, and a sixth bearing element 17.6, which is designed as a tapered roller bearing. The second output shaft 23.2 extends through the first housing section A as well as through the second housing section B. The fourth bearing element 17.4 is arranged, together with the transmission 12, in the first housing section A. The fifth bearing element 17.5 is arranged, together with the electric machine 13, in the second housing section B. The sixth bearing element 17.6 is arranged in the wall 16.1 of the housing 3 between the first housing section A and the second housing section B and is configured for routing coolant 6 from the second housing section B into the first housing section A. In particular, the routing of coolant 6 from the second housing section B into the first housing section A takes place by way of centrifugal forces via the sixth bearing element 17.6.

Moreover, a coolant sump 4, a coolant filter 15, a first coolant pump 5.1, a second coolant pump 5.2, a heat exchanger 7, and a coolant line system 8 including a coolant reservoir 9 are arranged in the housing 3. The coolant line system 8 fluidically connects the second coolant pump 5.2 to the heat exchanger 7 and fluidically connects the heat exchanger 7 to the coolant reservoir 9. The coolant 6 is routed, by the first coolant pump 5.1, from the first housing section A into the third housing section C, where the coolant sump 4 is arranged. Via the second coolant pump 5.2, coolant 6 is routed from the coolant sump 4 through the coolant filter 15 into the coolant line system 8. The heat exchanger 7 arranged between the second coolant pump 5.2 and the coolant reservoir 9 cools the coolant 6 delivered by the second coolant pump 5.2. The coolant 6 cooled by the heat exchanger 7 is delivered into the coolant reservoir 9 via the coolant line system 8. The coolant line system 8 and the coolant reservoir 9 are integrated in the housing 3, in the present case designed as indentations in a fourth housing section D. The coolant reservoir 9 has a single coolant inlet 10, which is configured for injecting coolant 6 from the heat exchanger 7 via the coolant line system 8. Moreover, the coolant reservoir 9 includes multiple coolant outlets 11.1, 11.2, 11.3, 11.4, 11.5, each of which is configured for spraying coolant 6 from the coolant reservoir 10 onto components in the housing 3 that require cooling and lubrication, in particular in the first housing section A and the second housing section B.

In the present case, the housing 3 includes the first housing section A for accommodating the transmission 12, the gear stage 22, and the first coolant pump 5.1. Moreover, the housing 3 includes the second housing section B for accommodating the electric machine 13 having the stator 13.1 and the rotor 13.2. In addition, the housing 3 includes the third housing section C for accommodating the coolant sump 4 and the coolant filter 15. For example, the coolant sump 4 can be understood as a coolant volume of a coolant container arranged in the housing section C. The coolant 6 is delivered from the first housing section A into the third housing section C via the first coolant pump 5.1 through a first opening 14.1, which is provided therefor, in a wall 16.2 between the first and third housing sections A, C in order to form the coolant sump 4 in the third housing section C. The first coolant pump 5.1 is designed as a centrifugal pump and is configured for delivering a liquid-air mixture. By comparison, the second coolant pump 5.2 is designed as a positive displacement pump.

Moreover, coolant 6 flows from the second housing section B into the third housing section C through a second opening 14.2, which is provided therefor, in a wall 16.3 between the second and third housing sections B, C in order to form the coolant sump 4 in the third housing section C. The first, second, and third housing sections A, B, C are designed as essentially closed housing cavities and are surrounded by the housing walls. The housing 3 also includes the fourth housing section D for accommodating the coolant line system 8, the coolant reservoir 9, the second coolant pump 5.2, and the heat exchanger 7. The fourth housing section D extends along the first, second, and third housing sections A, B, C and, in fact, in such a way that the coolant line system 8 and the coolant reservoir 9 are arranged outside the first, second, and third housing sections A, B, C. In particular, the housing 3 is formed as multiple pieces and is modularly designed.

Two first coolant outlets 11.1 are configured for spraying coolant 6 onto first and second stator windings 13.3, 13.4 of the stator 13.1, wherein the particular first coolant outlet 11.1 is fluidically connected to particular first spray nozzles 18.1. The stator windings 13.3, 13.4 are arranged at the end-side end surfaces of the stator 13.1 and, there, extend so as to be distributed in the circumferential direction. In the present case, only one first spray nozzle 18.1 for the first stator winding 13.3 and for the second stator winding 13.4 is represented in FIG. 1, for simplicity. As is apparent from FIG. 2, however, the first spray nozzles 18.1 are arranged circumferentially around the stator windings 13.3. As a result, the stator windings 13.3, 13.4 can be cooled in a targeted manner.

Figure 2:
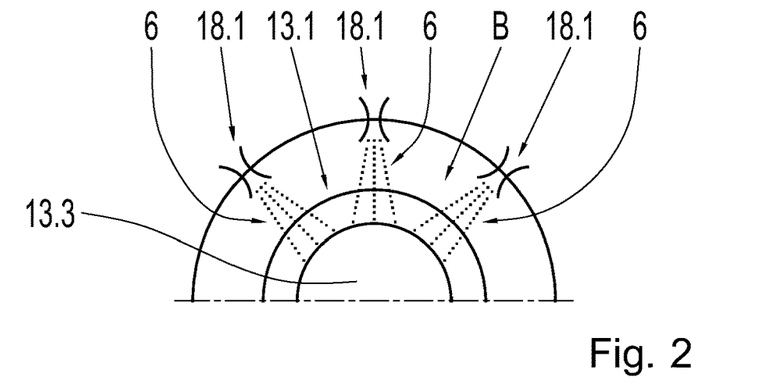
FIG. 2 shows a highly simplified diagrammatic cross-sectional representation of a detail of the housing according to FIG. 1.

According to FIG. 2, the coolant 6 is sprayed via three first spray nozzles 18.1 into the second housing section B onto the stator windings 13.3 of the stator 13.1. In the present case, due to the cross-sectional representation, only the first stator windings 13.3 are represented in a highly simplified manner.

The second coolant outlet 11.2 is configured for spraying coolant 6 onto an outer circumferential surface 13.5 of the stator 13.1, wherein the second coolant outlet 11.2 is fluidically connected to multiple second spray nozzles 18.2. In the present case, only one single second spray nozzle 18.2 is represented, for simplicity. As is apparent from FIG. 3, however, the second spray nozzles 18.2 are arranged in the longitudinal direction of the stator 13.2. As a result, the outer circumferential surface 13.5 of the stator 13.1 can be cooled in a targeted manner.

Figure 3:
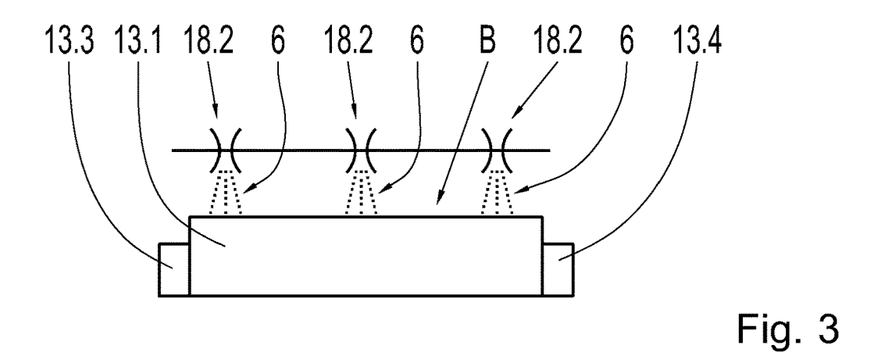
FIG. 3 shows a highly simplified diagrammatic longitudinal sectional representation of a detail of the housing according to FIG. 1.

According to FIG. 3, the coolant 6 is sprayed via three second spray nozzles 18.2 into the second housing section B onto the outer circumferential surface of the stator 13.1. The outer circumferential surface of the stator 13.1 extends in the axial direction from the first stator windings 13.3 up to the second stator windings 13.4.

The third coolant outlet 11.3 is configured for spraying coolant 6 onto a teeth-meshing area 19 of two gearwheels

20.1, 20.2 of the gear stage 22, wherein the third coolant outlet 11.3 is fluidically connected to multiple third spray nozzles 18.3. In the present case, only one single third spray nozzle 18.3 is represented, for simplicity. The first gearwheel 20.1 is rotationally fixed to the rotor shaft 13.6, wherein the second gearwheel 20.2 has a considerably greater diameter than the first gearwheel 20.1 and is rotationally fixed to a differential cage 24. Via the differential cage 24, the transmitted drive power is introduced into the differential gear and distributed onto the two output shafts 23.1, 23.2 of the differential gear.

The fourth coolant outlet 11.4 is configured for spraying coolant 6 onto the third bearing element 17.3, wherein the fourth coolant outlet 11.4 is fluidically connected to multiple fourth spray nozzles 18.4. In the present case, only one single fourth spray nozzle 18.4 is represented, for simplicity.

The fifth coolant outlet 11.5 is configured for spraying coolant 6 into a first pan 21.1, which is arranged next to the first bearing element 17.1, wherein the fifth coolant outlet 11.5 is fluidically connected to multiple fifth spray nozzles 18.5. In the present case, only one single fifth spray nozzle 18.5 is represented, for simplicity. The first pan 21.1 has a permeability for coolant 6, and so the coolant 6 can flow from the first pan 21.1, on the one hand, to the fourth bearing element 17.4 and, on the other hand, to the first bearing element 17.1. A second pan 21.2 is arranged at the third bearing element 17.3, wherein the coolant 6 can flow either directly out of the fourth spray nozzles 18.4 into the third bearing element 17.3 or via the second pan 21.2 into the third bearing element 17.3. Through the third bearing element 17.3, the coolant 6 from the first housing section A into the second housing section B.

The first coolant pump 5.1 has a greater delivery rate for coolant 6 than the joint delivery rate for coolant 6 of the third, fourth, and fifth coolant outlets 11.3, 11.4, 11.5, which deliver the coolant 6 into the first housing section A. In other words, a minimal coolant volume is implemented in the first housing section A, wherein the coolant 6 is sprayed, in a targeted manner and according to demand, through the particular coolant outlets 11.3, 11.4, 11.5 onto the components in the first housing section A requiring cooling and lubrication. Due to this coolant-reduced atmosphere in the first housing section A, in particular, churning losses are considerably reduced at the large second gearwheel 20.2, as the result of which the efficiency of the transmission 12 and, thereby, also the efficiency of the drive device 100 are increased.

FIG. 4 shows an electrically driven vehicle 2 including the drive device 100 according to example aspects of the invention, according to FIG. 1. The drive device 100 includes the device 1 according to example aspects of the invention for cooling and lubricating components of the vehicle 2, wherein the components of the vehicle 2 requiring lubrication and cooling are arranged within the housing 3 of the device 1. Components of the vehicle 2 are to be understood, at least, as the electric machine 13, which generates a drive power and introduces this into the transmission 12, and the transmission 12, which is designed as a differential gear. The transmission 12, which is designed as a differential gear, splits the drive power onto the first output shaft 23.1 and the second output shaft 23.2. Each output shaft 23.1, 23.2 is connected to a wheel 25.1, 25.2, respectively, of the vehicle 2 for driving. The vehicle 2 also includes an energy accumulator (not represented here), which is supplied by the electric machine 13 with electrical energy in the reverse power flow, in the generator mode. The energy accumulator can be, for example, a battery, or the like. Consequently, by the electric machine 13, in the generator mode, electrical energy can be generated, stored, and reserved for a re-supply of the electric machine 3 in a motor mode.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

1 device
2 vehicle
3 housing
4 coolant sump
5.1 first coolant pump
5.2 second coolant pump
6 coolant
7 heat exchanger
8 coolant line system
9 coolant reservoir
10 coolant inlet
11.1 first coolant outlet
11.2 second coolant outlet
11.3 third coolant outlet
11.4 fourth coolant outlet
11.5 fifth coolant outlet
12 transmission
13 electric machine
13.1 stator
13.2 rotor
13.3 first stator windings
13.4 second stator windings
13.5 outer circumferential surface of the stator
13.6 rotor shaft
14.1 first opening
14.2 second opening
15 coolant filter
16.1 wall between the first and second housing sections
16.2 wall between the first and third housing sections
16.3 wall between the second and third housing sections
17.1 first bearing element
17.2 second bearing element
17.3 third bearing element
17.4 fourth bearing element
17.5 fifth bearing element
17.6 sixth bearing element
18.1 first spray nozzle
18.2 second spray nozzle
18.3 third spray nozzle
18.4 fourth spray nozzle
18.5 fifth spray nozzle
19 teeth-meshing area
20.1 first gearwheel
20.2 second gearwheel
21.1 first pan
21.2 second pan 21.3 third pan
22 gear stage
23.1 first output shaft
23.2 second output shaft
24 differential cage
25.1 wheel
25.2 wheel
100 drive device
A first housing section
B second housing section
C third housing section
D fourth housing section

The invention claimed is:

1. A device (1) for cooling and lubricating components of a vehicle (2), comprising:
    at least one housing (3);
    a coolant sump (4);
    a first coolant pump (5.1) configured for delivering coolant (6) from a first housing section (A), which is configured for accommodating a transmission (12), into the coolant sump (4);
    a second coolant pump (5.2) configured for delivering coolant (6) from the coolant sump (4) into a coolant line system (8); and
    a heat exchanger (7) configured for cooling the coolant (6) delivered by the second coolant pump (5.2),
    wherein the coolant line system (8) fluidically connects at least the second coolant pump (5.2) to the heat exchanger (7) and, at least indirectly, fluidically connects the heat exchanger (7) to a plurality of coolant outlets (11.1, 11.2, 11.3, 11.4, 11.5) for spraying coolant (6) onto components in the housing (3) for cooling and lubrication.

2. The device (1) of claim 1, wherein the coolant line system (8) comprises a coolant reservoir (9) with one single coolant inlet (10), and the coolant outlets (11.1, 11.2, 11.3, 11.4, 11.5) are arranged at the coolant reservoir (9).

3. The device (1) of claim 1, wherein the housing (3) comprises a second housing section (B) for accommodating an electric machine (13) with a stator (13.1) and a rotor (13.2).

4. The device (1) of claim 3, wherein:
    the housing (3) comprises a third housing section (C);
    the coolant (6) is routable from the first housing section (A) at least via the first coolant pump (5.1) into the third housing section (C); and
    the coolant (6) is flowable from the second housing section (B) via at least one opening (14.2) into the third housing section (C) in order to form the coolant sump (4) there.

5. The device (1) of claim 4, further comprising at least one coolant filter (15) arranged in the third housing section (C), wherein the at least one coolant filter (15) is fluidically connected to the second coolant pump (5.2).

6. The device (1) of claim 1, wherein a wall (16.1) of the housing (3) between the first housing section (A) and the second housing section (B) is configured for accommodating at least one bearing element (17.3, 17.6), and the at least one bearing element (17.3, 17.6) is configured for routing coolant (6) between the first housing section (A) and the second housing section (B).

7. The device (1) of claim 1, wherein the housing (3) comprises a fourth housing section (D) for accommodating at least the coolant line system (8), and the fourth housing section (D) extends at least partially along the first, second, and third housing sections (A, B, C).

8. The device (1) of claim 1, wherein at least one first coolant outlet (11.1) of the plurality of coolant outlets is configured for spraying the coolant (6) onto stator windings (13.3, 13.4) of a stator (13.1) of an electric machine (13), and the at least one first coolant outlet (11.1) is fluidically connected to a plurality of first spray nozzles (18.1) arranged at least partially circumferentially around the stator windings (13.3, 13.4).

9. The device (1) of claim 1, wherein at least one second coolant outlet (11.2) of the plurality of coolant outlets is configured for spraying the coolant (6) onto an outer circumferential surface (13.5) of a stator (13.1) of an electric machine (13), and the at least one second coolant outlet (11.2) is fluidically connected to a plurality of second spray nozzles (18.2) arranged along a longitudinal direction of the stator (13.2).

10. The device (1) of claim 1, wherein at least one third coolant outlet (11.3) of the plurality of coolant outlets is configured for spraying the coolant (6) onto at least one teeth-meshing area (19) of gearwheels (20.1, 20.2), at least one fourth coolant outlet (11.4) of the plurality of coolant outlets is configured for spraying the coolant (6) onto at least one bearing element (17.3), and at least one fifth coolant outlet (11.5) of the plurality of coolant outlets is configured for spraying the coolant (6) into at least one first pan (21.1).

11. The device (1) of claim 10, wherein:
    the first coolant pump (5.1) has a greater delivery rate for the coolant (6) than a joint delivery rate for the coolant (6) of the at least one third coolant outlet (11.3), the at least one fourth coolant outlet (11.4), and the at least one fifth coolant outlet (11.5); and
    the at least one third coolant outlet (11.3), the at least one fourth coolant outlet (11.4), and the at least one fifth coolant outlet (11.5) are configured to deliver the coolant (6) into the first housing section (A).

12. The device (1) of claim 1, wherein the first coolant pump (5.1) is configured for delivering a liquid-air mixture, and the second coolant pump (5.2) is a positive displacement pump.

13. A drive device (100) for a vehicle (2), comprising:
    the device (1) of claim 1;
    a housing (3);
    an electric machine (13) with a stator (13.1) and a rotor (13.2); and
    a transmission (12),
    wherein a rotor shaft (13.6) of the electric machine (13) is drivingly connected to the transmission (12) via at least one gear stage (22) that includes a first gearwheel (20.1) and a second gearwheel (20.2),
    wherein the transmission (12) is configured as a differential gear and includes a first output shaft (23.1) and a second output shaft (23.2), and
    wherein the first and second output shafts (23.1, 23.2) are arranged axially parallel to the rotor shaft (13.6).

14. The drive device (100) of claim 13, wherein:
    the rotor shaft (13.6) is rotatably mounted in the transmission (3) via a first bearing element (17.1), a second bearing element (17.2), and a third bearing element (17.3);
    the first bearing element (17.1), the transmission (12), and the first coolant pump (5.1) are arranged in the first housing section (A);
    the second bearing element (17.2) and the electric machine (13) are arranged in a second housing section (B); and the third bearing element (17.3) is arranged in a wall (16.1) of the housing (3) between the first housing section (A) and the second housing section (B).

15. The drive device (100) of claim 13, wherein:

the first output shaft (23.1) is rotatably mounted in the housing (3) via a fourth bearing element (17.4);

the second output shaft (23.2) is rotatably mounted in the housing (3) via a fifth bearing element (17.5) and a sixth bearing element (17.6);

the fourth bearing element (17.4), the transmission (12), and the first coolant pump (5.1) are arranged in the first housing section (A);

the fifth bearing element (17.5) and the electric machine (13) are arranged in a second housing section (B); and the sixth bearing element (17.6) is arranged in a wall (16.1) of the housing (3) between the first housing section (A) and the second housing section (B).

\* \* \* \* \*